(12) United States Patent
Klodowski et al.

(10) Patent No.: US 7,855,906 B2
(45) Date of Patent: Dec. 21, 2010

(54) DC BUS VOLTAGE CONTROL FOR TWO STAGE SOLAR CONVERTER

(75) Inventors: Anthony Michael Klodowski, Hardy, VA (US); David Smith, Daleville, VA (US); Robert Gregory Wagoner, Roanoke, VA (US); Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/605,514

(22) Filed: Oct. 26, 2009

(65) Prior Publication Data

US 2010/0133904 A1 Jun. 3, 2010

(51) Int. Cl.
*H02M 7/537* (2006.01)
*H02M 7/539* (2006.01)

(52) U.S. Cl. ....................................................... 363/97

(58) Field of Classification Search ................... 363/35, 363/36, 95, 97, 98, 131, 132
See application file for complete search history.

(56) References Cited

U.S. PATENT DOCUMENTS

| | | | |
|---|---|---|---|
| 4,404,472 A | | 9/1983 | Steigerwald |
| 4,667,283 A | | 5/1987 | Seki et al. |
| 5,280,228 A | | 1/1994 | Kanouda et al. |
| 5,329,222 A | * | 7/1994 | Gyugyi et al. ............... 323/207 |
| 5,384,696 A | | 1/1995 | Moran et al. |
| 5,835,353 A | | 11/1998 | Dalby |
| 5,892,675 A | | 4/1999 | Yatsu et al. |
| 5,917,711 A | * | 6/1999 | Shikata et al. ................. 363/16 |
| 6,058,035 A | | 5/2000 | Madenokouji et al. |
| 6,081,104 A | * | 6/2000 | Kern ........................... 323/268 |
| 6,134,124 A | | 10/2000 | Jungreis et al. |
| 6,229,722 B1 | | 5/2001 | Ichikawa et al. |
| 6,285,572 B1 | | 9/2001 | Onizuka et al. |
| 6,291,764 B1 | | 9/2001 | Ishida et al. |
| 6,316,918 B1 | | 11/2001 | Underwood et al. |
| 6,339,538 B1 | | 1/2002 | Handleman |

(Continued)

FOREIGN PATENT DOCUMENTS

EP 0947904 B1 10/2003

(Continued)

OTHER PUBLICATIONS

English Abstract of EP 1463188A2.

*Primary Examiner*—Gary L Laxton
(74) *Attorney, Agent, or Firm*—Dority & Manning, P.A.

(57) ABSTRACT

Systems, methods, and apparatus for supplying AC power to an AC power grid from a DC power source, such as a photovoltaic (PV) array are disclosed. The systems and methods can include a converter coupled to the DC power source that provides DC power to a DC bus at a DC bus voltage. The systems and methods can further include an inverter coupled to the DC bus for converting the DC power of the DC bus to an output AC power. The systems and methods can further include a control system configured to regulate the DC bus voltage of the DC bus to operate at a variable DC bus voltage setpoint. The control system can adjust the DC bus voltage setpoint based at least in part on the DC bus voltage and the output AC current of the inverter.

20 Claims, 5 Drawing Sheets

U.S. PATENT DOCUMENTS

| | | |
|---|---|---|
| 6,369,462 B1 | 4/2002 | Siri |
| 6,373,731 B1 | 4/2002 | Iwamura et al. |
| 6,380,719 B2 | 4/2002 | Underwood et al. |
| 6,411,065 B1 | 6/2002 | Underwood et al. |
| 6,452,289 B1 | 9/2002 | Lansberry et al. |
| 6,690,589 B2 | 2/2004 | Barnett et al. |
| 6,693,809 B2 | 2/2004 | Engler |
| 6,765,315 B2 | 7/2004 | Hammerstrom et al. |
| 6,809,942 B2 | 10/2004 | Madenokouji et al. |
| 6,853,940 B2 | 2/2005 | Tuladhar |
| 6,914,418 B2 | 7/2005 | Sung |
| 6,940,735 B2 | 9/2005 | Deng et al. |
| 6,963,147 B2 | 11/2005 | Kurokami et al. |
| 6,979,980 B1 | 12/2005 | Hesterman et al. |
| 7,015,597 B2 | 3/2006 | Colby et al. |
| 7,072,194 B2 | 7/2006 | Nayar et al. |
| 7,099,169 B2 * | 8/2006 | West et al. ............. 363/132 |
| 7,119,452 B2 | 10/2006 | Larsen |
| 7,120,039 B2 | 10/2006 | Burger et al. |
| 7,145,266 B2 | 12/2006 | Lynch et al. |
| 7,158,395 B2 | 1/2007 | Deng et al. |
| 7,183,667 B2 | 2/2007 | Colby et al. |
| 7,193,872 B2 | 3/2007 | Siri |
| 7,239,036 B2 | 7/2007 | D'Atre et al. |
| 7,256,566 B2 | 8/2007 | Bhavaraju et al. |
| 7,319,313 B2 | 1/2008 | Dickerson et al. |
| 7,324,361 B2 | 1/2008 | Siri |
| 7,333,349 B2 | 2/2008 | Chang et al. |
| 7,333,352 B2 | 2/2008 | Petter et al. |
| 7,338,311 B2 | 3/2008 | Laschinksi et al. |
| 7,339,287 B2 | 3/2008 | Jepsen et al. |
| 7,348,739 B2 * | 3/2008 | Urakabe et al. ......... 318/254.2 |
| 7,397,653 B2 | 7/2008 | Taylor |
| 7,405,496 B2 | 7/2008 | Wagoner et al. |
| 7,411,802 B2 | 8/2008 | Victor et al. |
| 7,414,870 B2 | 8/2008 | Röttger et al. |
| 7,423,894 B2 | 9/2008 | Ilic |
| 7,432,618 B2 | 10/2008 | Taylor |
| 7,433,215 B2 | 10/2008 | Taylor et al. |
| 7,443,052 B2 | 10/2008 | Wendt et al. |
| 7,463,489 B2 | 12/2008 | Falk et al. |
| 7,463,500 B2 | 12/2008 | West |
| 7,471,073 B2 | 12/2008 | Bettenwort et al. |
| 7,479,774 B2 | 1/2009 | Wai et al. |
| 2006/0097578 A1 | 5/2006 | Baldwin et al. |
| 2006/0103341 A1 | 5/2006 | Steigerwald et al. |
| 2007/0024059 A1 | 2/2007 | D'Atre et al. |
| 2007/0100506 A1 | 5/2007 | Teichmann |
| 2007/0236187 A1 | 10/2007 | Wai et al. |
| 2007/0252716 A1 | 11/2007 | Burger |
| 2007/0273338 A1 | 11/2007 | West |
| 2008/0094867 A1 | 4/2008 | Muller et al. |
| 2008/0101101 A1 | 5/2008 | Iwata et al. |
| 2008/0122293 A1 | 5/2008 | Ohm |
| 2008/0150366 A1 | 6/2008 | Adest et al. |
| 2008/0180979 A1 | 7/2008 | Taylor et al. |
| 2008/0192510 A1 | 8/2008 | Falk |
| 2008/0197825 A1 | 8/2008 | Siri |
| 2008/0232145 A1 | 9/2008 | Hiller et al. |
| 2008/0257397 A1 | 10/2008 | Glaser et al. |
| 2008/0290252 A1 | 11/2008 | Leonhardt et al. |
| 2008/0291706 A1 | 11/2008 | Seymour et al. |
| 2008/0304302 A1 | 12/2008 | Wagoner et al. |
| 2009/0003024 A1 | 1/2009 | Knaup |
| 2009/0046491 A1 | 2/2009 | Zacharias et al. |
| 2009/0046492 A1 | 2/2009 | Zacharias et al. |
| 2009/0177333 A1 | 7/2009 | Delmerico |

FOREIGN PATENT DOCUMENTS

| | | |
|---|---|---|
| EP | 1463188 A2 | 9/2004 |
| EP | 1861914 B1 | 12/2008 |
| EP | 1178596 B1 | 2/2009 |
| WO | WO 2008/015298 A1 | 2/2008 |
| WO | WO 2008/096019 A1 | 8/2008 |

* cited by examiner

DC BUS VOLTAGE CONTROL FOR TWO STAGE SOLAR CONVERTER

FIELD OF THE INVENTION

The present invention relates generally to the field of solar power generation and, more particularly, to methods and systems for controlling DC bus voltage in a solar power converter.

BACKGROUND OF THE INVENTION

Solar power generation is becoming a progressively larger source of energy throughout the world. Solar power generation systems typically include one or more photovoltaic arrays (PV arrays) having multiple interconnected solar cells that convert solar energy into DC power through the photovoltaic effect. In order to interface the output of the PV arrays to a utility grid, a solar converter is needed to change the DC current and DC voltage output of the PV array into a 60/50 Hz AC current waveform that feeds power to the utility grid.

Various solar power converters exist for interfacing the DC output of a PV array into AC power. One implementation of a solar power converter consists of two stages, a boost converter stage and an inverter stage. The boost converter controls the flow of DC power from the PV array onto a DC bus. The inverter converts the power supplied to the DC bus into an AC current and AC voltage that can be output to the AC grid.

Existing solar power converters utilize control systems to regulate the boost converter and the inverter to compensate for various system variables, such as AC grid voltage magnitude, voltage drops across power devices, such as insulated gate bipolar transistors (IGBTs), diodes and reactors used in the solar power converter, transformers and conductors used in the solar power collection system, and other system variables. To accommodate a normal working range of grid voltage, such as, for instance ±10% of nominal grid voltage, the control system will typically regulate the DC bus voltage of the solar power converter to operate at a fixed DC bus voltage setpoint, such as about 110% of the nominal AC grid voltage. The use of a fixed DC bus voltage setpoint, however, does not optimize the efficiency of the solar power converter, often resulting in higher semiconductor junction temperatures for the IGBTs and diodes of the solar power converter and in higher harmonic frequencies output to the AC grid. This is particularly true when the AC grid voltage is less than the voltage of the DC bus voltage.

Thus, there is a need for a solar power converter that regulates DC bus voltage to increase the efficiency of the solar power converter that overcomes the above disadvantages.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to an apparatus for supplying AC power to an AC power grid from a DC power source, such as, for instance, a PV array. The apparatus can include a converter coupled to the DC power source. The converter provides DC power from the DC power source to a DC bus. The apparatus further includes an inverter coupled to the DC bus. The inverter converts the DC power of the DC bus into AC power that can be output to an AC power grid. The apparatus further includes a control system configured to regulate the DC bus voltage of the DC bus to operate at a variable DC bus voltage setpoint. The control system is configured to adjust the magnitude of the variable DC bus voltage setpoint based at least in part on the an output AC current of the inverter.

Another exemplary embodiment of the present invention is directed to a method for controlling a DC bus voltage in a system for providing AC power to an AC power grid from a DC power source. The method includes providing DC power to a DC bus at a DC bus voltage and converting the DC power on the DC bus to AC power with an inverter coupled to the DC bus. The method can include controlling the DC bus voltage to operate at a DC bus voltage setpoint and varying the DC bus voltage setpoint based at least in part on an output AC current of the inverter.

Variations and modifications can be made to these exemplary embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DRAWINGS

Figure 1:
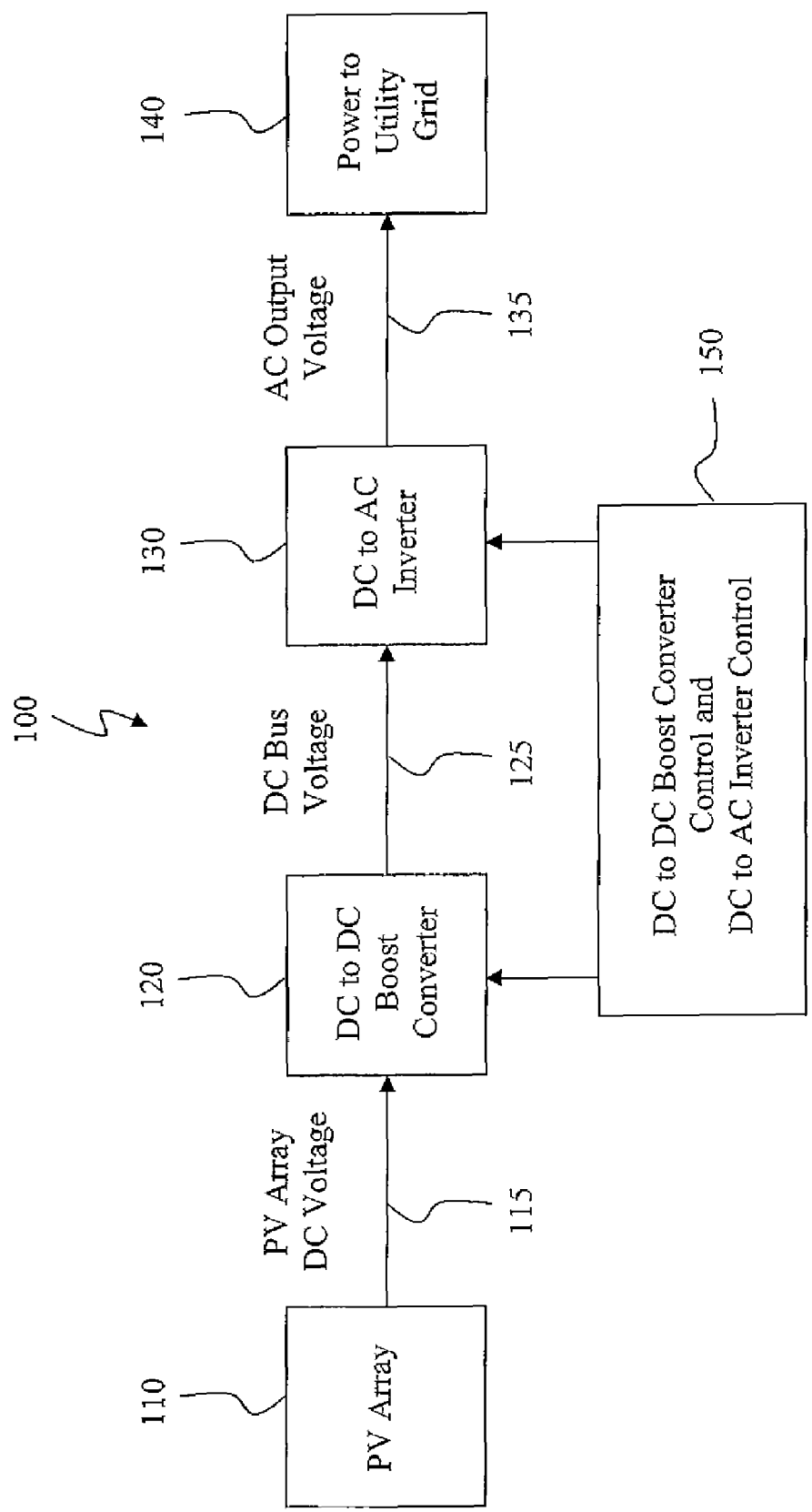
FIG. 1 provides a block diagram of a solar power converter system in accordance with an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention encompass such modifications and variations as come within the scope of the appended claims and their equivalents.

Generally, the present disclosure is directed to methods and apparatus for supplying AC power to an AC power grid from a DC power source, such as a PV array. FIG. 1 depicts a conceptual block diagram of an exemplary two stage power converter 100 used to convert DC power 115 from a PV array 110 into AC power suitable for feeding an AC power grid 140.

The first stage of power converter 100 can include a DC to DC converter 120, such as a boost converter, that outputs DC power 125 onto a DC bus. The second stage of the power converter can be an inverter 130 that converts the DC power 125 on the DC bus to an AC power 135 suitable for being fed to an AC power grid 140.

A control system 150 can control the DC bus voltage of the DC bus by controlling the output AC current of inverter 130. In particular, inverter 130 can be regulated by control system 150 such that the real power flow (i.e. the real part of the vector product of the inverter output AC voltage and the inverter output AC current) to the AC grid 140 from inverter 130 is equal to the power supplied to the DC bus by DC to DC converter 120. Varying the inverter output AC current will result in a change to the inverter output AC voltage, based on the impedance of the output transformer and the utility grid. Hence, controlling the output power of the inverter is possible by adjusting the AC output current. Adjusting the output power of the inverter will correspondingly induce a change in the DC bus voltage on the DC bus. Thus, by controlling the output AC current of inverter 130, the corresponding output AC voltage of inverter 130 and the DC bus voltage of the DC bus are also controlled.

The output AC current of inverter 130 and, correspondingly, the DC bus voltage of the DC bus, can be regulated using a control system 150 that controls inverter 130. Control system 150 can regulate the output of inverter 130 such that the DC bus voltage operates at a variable DC bus voltage setpoint. The switching loss of the power semiconductors, such as for instance IGBTs, is related to the DC bus voltage such that, as the DC bus voltage is decreased, the switching loss of the power semiconductors is also decreased. By adjusting the magnitude of the variable DC bus voltage setpoint based on a sensed DC bus voltage and by controlling the DC bus voltage based on the output AC current of inverter 130, it is possible for the control system to increase the efficiency of inverter 130.

For instance, in certain embodiments, control system 150 adjusts the magnitude of the variable DC bus voltage setpoint such that inverter 130 has a constant modulation index. As used herein, the term "modulation index" is intended to refer to a scalar quantity that measures the ratio of the peak AC output voltage of inverter 130 to the DC bus voltage. By including control system 150 that can be configured to regulate the magnitude of the DC bus voltage setpoint based on the DC bus voltage and the output AC current of inverter 130, the subject matter of the present disclosure provides advantages over known power converter control systems.

For instance, the modulation index of inverter 130 can be kept to a fixed value irrespective of expected variations in system variables such as grid voltage magnitude and voltage drops across power devices, such as IGBTs, diodes, conductors, transformers, reactors and other devices. In addition, the systems and methods for bus voltage control according to embodiments of the present disclosure can provide for improved inverter 130 efficiency, lower semiconductor junction temperatures, and improved harmonic output to the AC grid.

Figure 2:
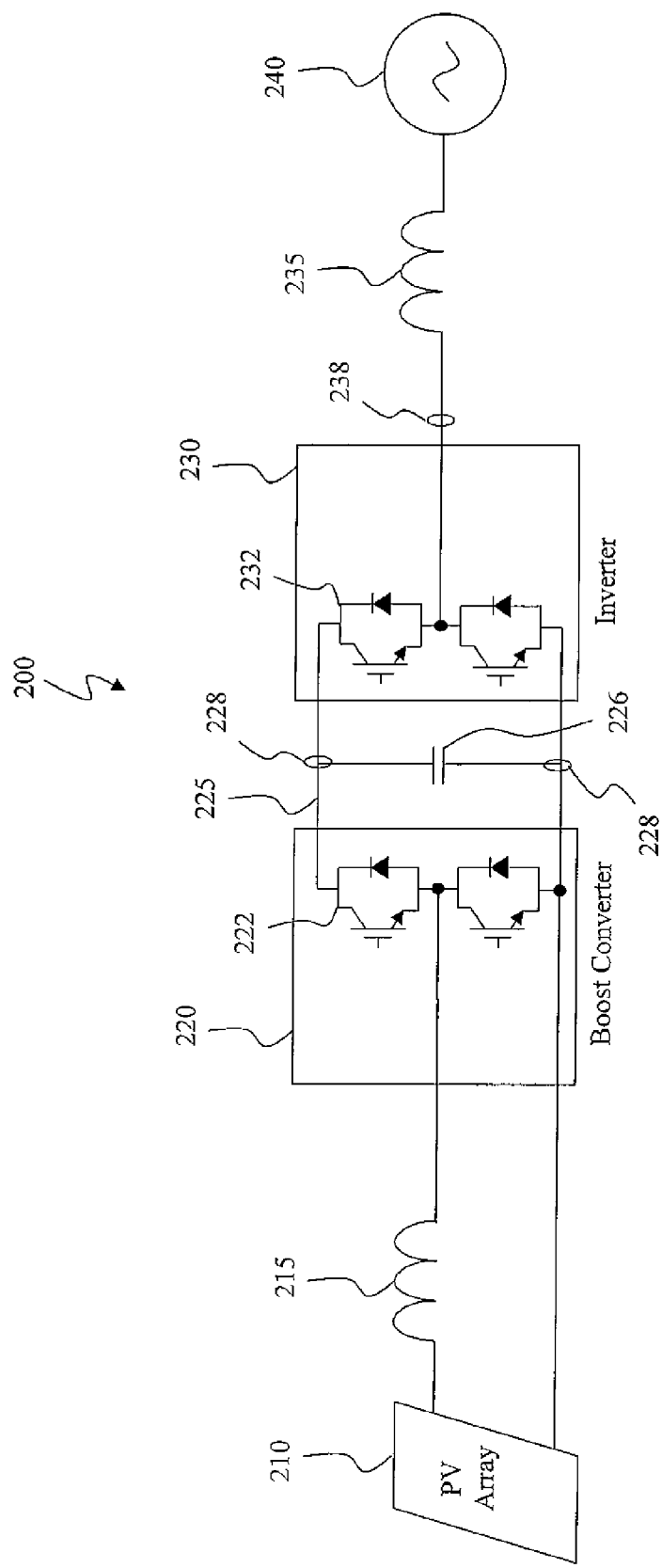
FIG. 2 provides a circuit diagram of a solar power generation system in accordance with an exemplary embodiment of the present disclosure.

Referring now to the FIG. 2, an exemplary two stage power converter system 200 for supplying AC power to an AC power grid 240 from PV array 210 will now be discussed in detail. PV array 210 has a plurality of interconnected solar cells that produce a DC voltage and a DC current in response to solar energy incident on the PV array 210. The DC output of PV array 210 can be coupled to boost converter 220 through DC reactor 215. Only a portion of the circuitry of boost converter 220 is depicted in FIG. 2. FIG. 2 depicts three PV arrays 210 connected in parallel to boost converter 220. Those of ordinary skill in the art, using the disclosures provided herein, should readily understand that boost converter 220 can include any number of parallel PV array inputs without deviating from the scope or spirit of the present invention.

Boost converter 220 boosts the DC voltage output of PV array 210 to a higher DC bus voltage and controls the flow of DC power onto DC bus 225. While a boost converter 220 is depicted in FIG. 2, those of ordinary skill in the art will understand, using the disclosures provided herein, that any form of DC to DC converter configured to regulate the DC power provided to DC bus 225 is within the scope of the present disclosure. For instance, the DC to DC converter can be a boost converter, buck converter, or buck/boost converter.

Boost converter 220 regulates the flow of DC power onto DC bus 225. Boost converter 220 controls the flow of power onto DC bus 225 by regulating either the DC input current or DC input voltage to DC bus 225, depending on the type of control system regulating boost converter 220. In particular embodiments, boost converter 220 can be controlled by sending gate timing commands to IGBTs 222 utilized in boost converter 220.

Boost converter 220 supplies DC power to DC bus 225. DC bus operates at a DC bus voltage that is regulated by inverter 230. DC bus 220 can include one or more capacitors 226 to provide stability to DC bus 220. As will be discussed in more detail below, embodiments of the present disclosure regulate the DC bus voltage of DC bus 225 to operate at a DC bus voltage setpoint.

Inverter 230 converts the DC power of DC bus 225 into AC power that is suitable for being fed to AC power grid 240. Only a portion of the circuitry of inverter 230 is depicted in FIG. 2. FIG. 2 illustrates a three-phase AC output for inverter 230. However, those of ordinary skill in the art, using the disclosures provided herein, should readily understand that inverter 230 can similarly provide a single-phase AC output or other multi-phase AC output as desired without deviating from the scope of the present invention.

Inverter 230 utilizes one or more inverter bridge circuits 232 that include power devices, such as IGBTs and diodes that are used to convert the DC power on DC bus 225 into a suitable AC waveform. For instance, in certain embodiments, inverter 230 uses pulse-width-modulation (PWM) to synthesize an output AC voltage at the AC grid frequency. The output of inverter 230 can be controlled by providing gate timing commands to the IGBTs of the inverter bridge circuits 232 of inverter 230, according to well known PWM control techniques. The output AC current flowing from inverter 230 has components at the PWM chopping frequency and the grid frequency.

The AC output of inverter 230 is coupled to the AC power grid 240 through AC reactor 235. Various electrical components and devices can be included between the output of inverter 230 and AC power grid 240. For instance, one or more conductors, buses, transformers, breakers, surge protection devices, power factor correction devices, etc. can be included between the output of AC inverter 230 and AC power grid 240.

Power converter 200 can also include a monitoring system configured to monitor various system parameters of power converter 200. For instance, power converter 200 can include a monitoring system configured to monitor the DC bus voltage of DC bus 225 and the output AC current of inverter 230. FIG. 2 depicts locations for a DC bus voltage sensor 228 and an output AC current sensor 238. DC bus voltage sensor 228 can be used by a control system to generate a DC bus voltage feedback signal based on the DC bus voltage of the DC bus 225. Output AC current sensor 238 can be used to generate an output AC current feedback signal based on the output AC current of inverter 230. In certain embodiments, the AC output current of inverter 230 is measured prior to any electrical devices that couple the inverter 230 to the AC power grid 240, such as conductors, transformers, reactors, power factor correction devices, etc. In this manner, variations in AC current caused by such electrical devices can be avoided. As will be discussed in detail with respect to FIG. 3, embodiments of the present disclosure utilize the DC bus voltage feedback signal and the output AC current feedback signal to regulate the DC bus voltage of power converter 200.

Figure 3:
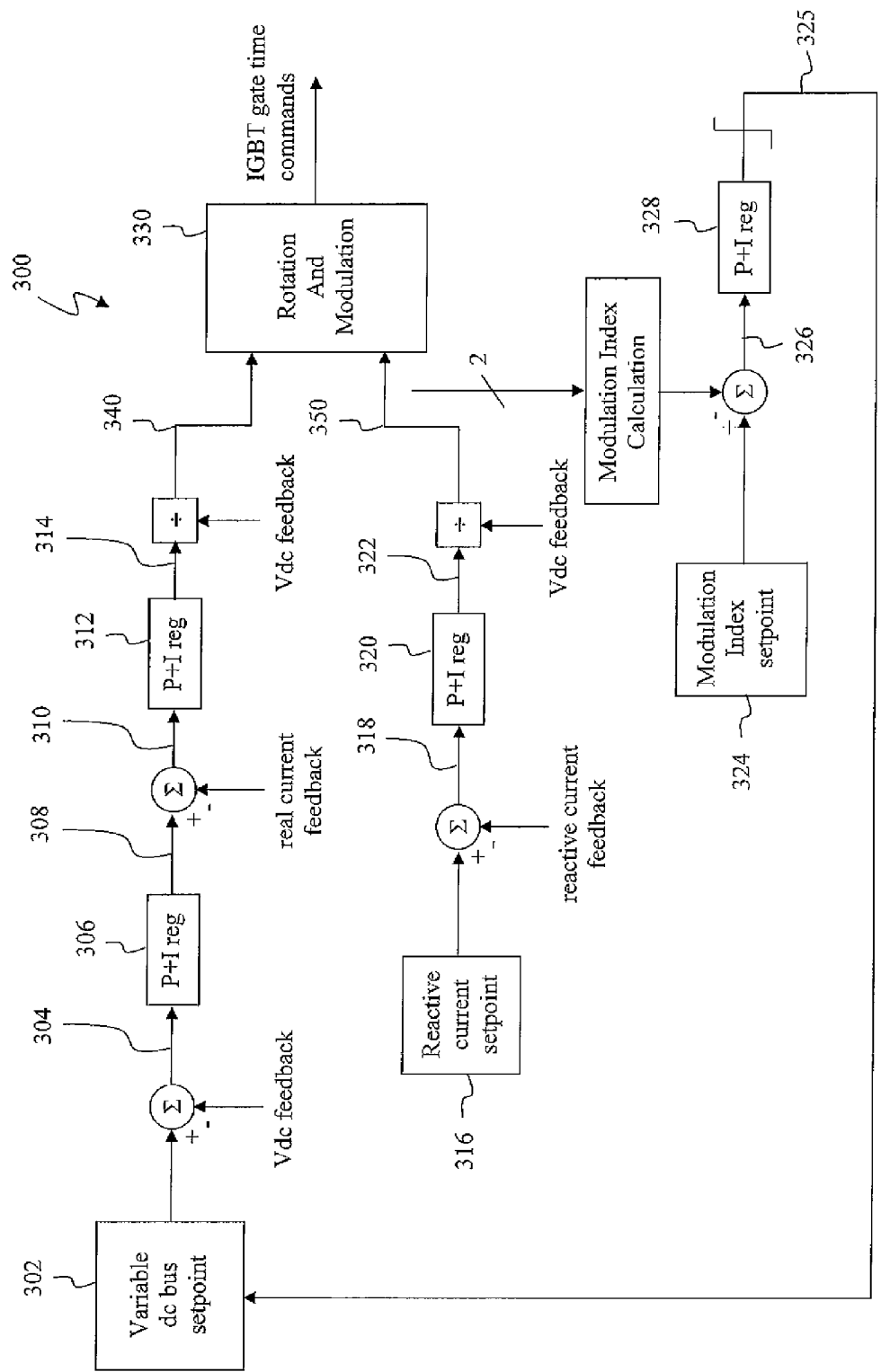
FIG. 3 depicts a circuit diagram of a regulator topology for a solar power converter system according to an exemplary embodiment of the present disclosure.

Referring now to FIG. 3, a control system 300 according to one exemplary embodiment of the present disclosure will now be discussed. Control system 300 includes a regulator 328 that regulates the level of the variable DC bus voltage setpoint 302 to operate inverter 330 at a constant modulation index. For instance, the inverter 330 can be operated at a modulation index in the range of about 0.0 to about 2.0, such as about 0.9 to about 1.5, such as about 0.97 to about 1.2. In this manner, the ratio of the DC bus voltage to the peak output AC voltage of the inverter can be kept substantially constant at a desired level in order to increase the efficiency of inverter 330.

Variable DC bus voltage setpoint 302 is a signal that indicates a desired DC bus voltage of the DC bus. Variable DC bus voltage setpoint 302 is adjusted based on the output of DC bus voltage setpoint regulator 328 so that the modulation index of inverter 330 is kept substantially constant.

Variable DC bus voltage setpoint 302 is compared to the DC bus voltage feedback signal to generate a DC bus voltage error signal 304. DC bus voltage error signal 304 is an input into voltage regulator 306, which generates real current reference command 308 based on DC bus voltage error signal 304. Voltage regulator 306 can be a proportional regulator, proportional integral regulator, proportional derivative regulator, proportional integral derivative regulator, or other suitable regulator. Real current reference command 308 provides an indication of the real output AC current to be provided by inverter 330 to operate the DC bus voltage at the variable DC bus voltage setpoint 302.

Real current reference command 308 is compared with the output AC current feedback signal to generate a real output AC current error signal 310. Real output AC current error signal 310 is provided to current regulator 312, which generates a real voltage reference command 314. Similar to voltage regulator 308, real current regulator 312 can be a proportional regulator, proportional integral regulator, proportional derivative regulator, proportional integral derivative regulator, or other suitable regulator. Real voltage reference command 314 provides an indication of the real output AC voltage to be provided by inverter 330 to achieve the output AC current necessary to operate the DC bus voltage at the variable DC bus voltage setpoint 432.

Real voltage reference command 314 is normalized by dividing the real voltage reference command 314 by the DC bus voltage feedback signal to generate a first modulation command 340 which is provided to inverter 330. Inverter 330 generates IGBT gate timing commands to regulate the output of inverter 330 to achieve the output AC current necessary to operate the DC bus voltage at the variable DC bus voltage setpoint value 302 based at least in part on first modulation command 340.

Control system 300 can further include a reactive current regulator 320 to regulate inverter 330 to output a desired amount of reactive current to the AC grid. Reactive current setpoint 316 is a signal that indicates the desired AC reactive current to be output by inverter 330. Reactive current setpoint 316 can be set by a utility grid operator or other operator.

Reactive current setpoint 316 is compared with the output AC current feedback signal to generate a reactive output AC current error signal 318. Reactive output AC current error signal 318 is provided to current regulator 320, which generates a reactive voltage reference command 322. Reactive current regulator 320 can be a proportional integral regulator, proportional derivative regulator, proportional integral derivative regulator, or other suitable regulator. Reactive voltage reference command 322 is normalized by dividing the reactive voltage reference command 322 by the DC bus voltage feedback signal to generate a second modulation command 350 which is provided to inverter 330. Inverter 330 generates IGBT gate timing commands to regulate the reactive current output of inverter 330 based at least in part on second modulation command 350 to generate a reactive AC output current substantially equal to the reactive current setpoint 316.

Control system 300 includes a control loop to regulate the level of the variable DC bus voltage setpoint 302. This control loop determines a modulation index feedback signal of inverter 330 based on first modulation command 340 and second modulation command 350. For instance, in particular embodiments, the modulation index feedback signal can be calculated according to the following formula:

$$M_{xy} = \sqrt{U_x^2 + U_y^2}$$

where $M_{xy}$ is the calculated modulation index and $U_x$ is the first modulation command 340 and $U_y$ is the second modulation command 350.

The calculated modulation index is compared to a modulation index setpoint 324 to generate a modulation index error signal 326. Modulation index setpoint 324 can be set by a utility grid operator or other operator to be at a desired value for inverter 330. For instance, in particular embodiments, the modulation index setpoint 424 can be in the range of about 0.0 to about 2.0, such as about 0.9 to about 1.5, such as about 0.97 to about 1.2.

Modulation index error signal 326 is provided to DC bus voltage setpoint regulator 328, which generates a DC bus voltage setpoint command 325 based on the modulation index error signal 326. DC bus voltage setpoint regulator 328 can be a proportional integral regulator, proportional derivative regulator, proportional integral derivative regulator, or other suitable regulator. The control system 300 adjusts the DC bus voltage setpoint 302 based on DC bus voltage setpoint command 325 such that inverter 330 operates at a constant modulation index.

In particular embodiments, control system 300 can include upper and lower limits on the range of the variable DC bus voltage setpoint 302 to keep the DC bus within a desired range. For instance, the lower limit on the variable DC bus voltage setpoint 302 can be the nominal AC grid voltage. This upper limit on the variable DC bus voltage setpoint 302 can be about 115% of the nominal AC grid voltage. By including upper and lower limits on the variable DC bus voltage setpoint 302, control system 300 can keep the DC bus voltage within a desired range when the AC grid voltage varies beyond a range for which normal performance is required.

As discussed in detail above, control system 300 regulates the modulation index of inverter 330 such that the modulation index can be controlled to a fixed value irrespective of expected variations in system variables such as grid voltage magnitude and voltage drops across power devices. This allows for improved inverter efficiency, lower semiconductor junction temperatures, improved harmonic output to the AC grid, and improved reliability of the power converter system.

Figure 4:
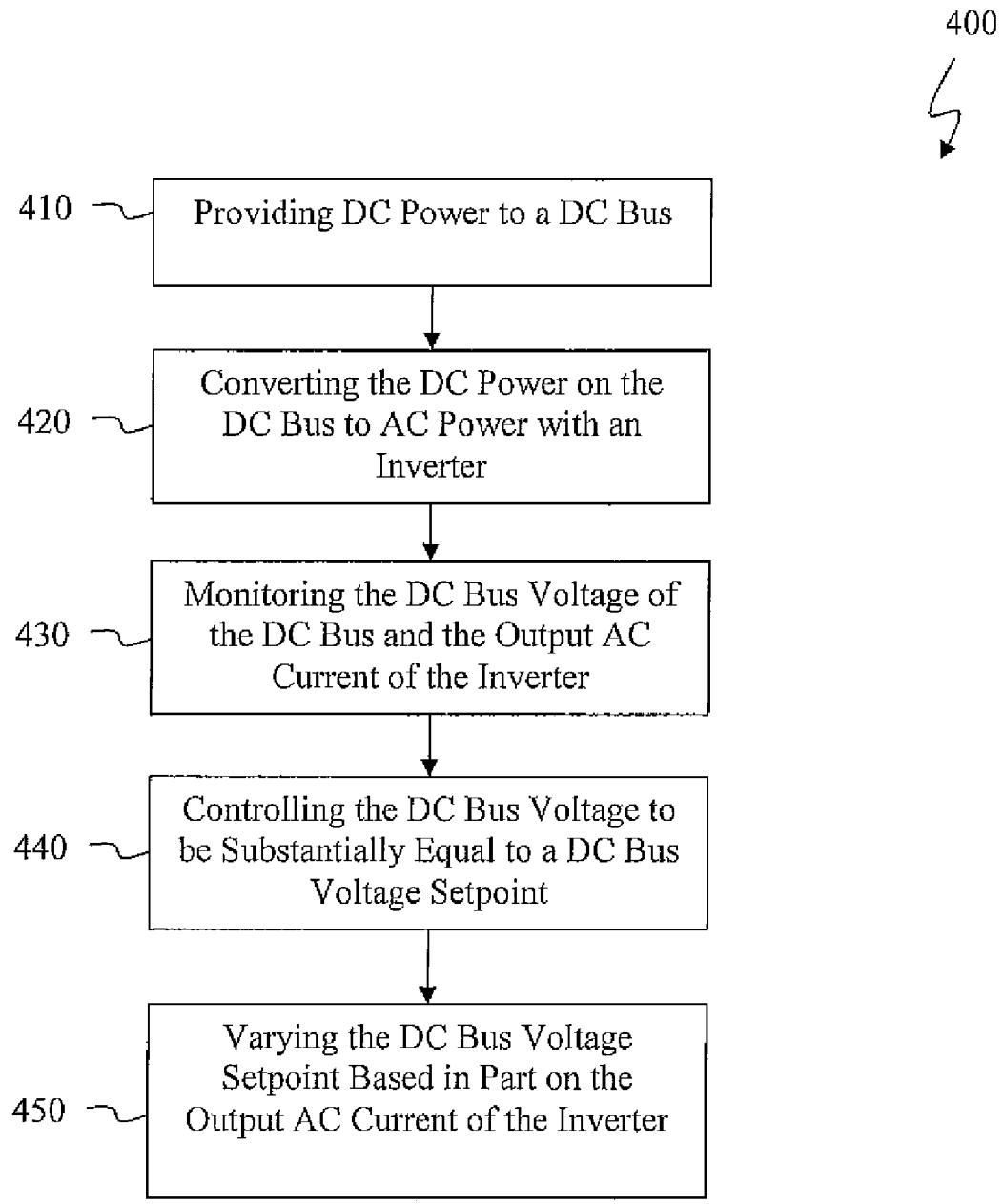
FIG. 4 depicts a flow diagram of an exemplary method according to one exemplary embodiment of the present disclosure; and, FIG. 5 depicts a flow diagram of an exemplary method according to another exemplary embodiment of the present disclosure.

FIG. 4 illustrates a flow diagram for a method 400 for controlling DC bus voltage according to one exemplary embodiment of the present disclosure. Initially, at 410, DC power is provided from a DC power source, such as a PV array, through a converter to a DC bus. At 420, the DC power on the DC bus is converted into AC power using an inverter. At 430, the DC bus voltage of the DC bus and the output AC current of the inverter are monitored using, for instance a monitoring system including a DC bus voltage sensor and an output AC current sensor. At 440, the DC bus voltage is controlled to be substantially equal to a DC bus voltage setpoint. At 450, the method 400 includes varying the DC bus voltage setpoint based at least in part on the output AC current of the inverter.

Figure 5:
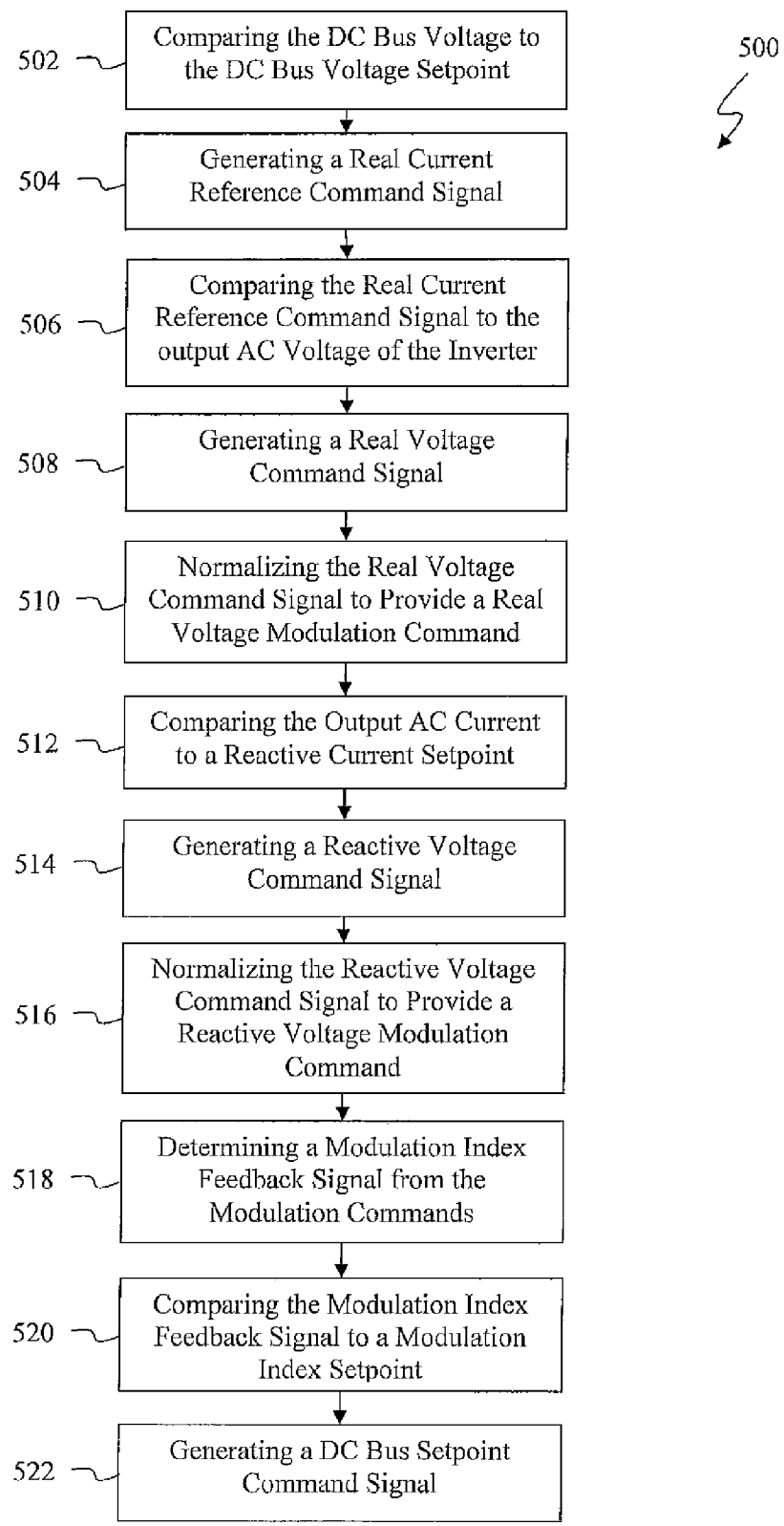

FIG. 5 illustrates a flow diagram for a method 500 varying the DC bus voltage setpoint according to one exemplary embodiment of the present disclosure. Initially, at 502, the DC bus voltage is compared to the DC bus voltage setpoint. At 504, a real current reference command signal is generated based on the comparison of the DC bus voltage and the DC bus voltage setpoint. At 506, the real current reference command signal is compared to the output AC current of the inverter. At 508, a real voltage command signal is generated based on the comparison of the real current reference command signal and the output AC current of the inverter. At 510, the real voltage command signal is normalized to provide a real voltage modulation command.

At 512, the method 500 optionally includes comparing the output AC current of the inverter to a reactive current setpoint. At 514, a reactive voltage reference command signal is generated based on the comparison of the output AC current of the inverter to the reactive current setpoint. At 516, the reactive voltage reference command signal is normalized to provide a reactive voltage modulation command.

At 518, the method 500 includes determining a modulation index feedback signal from the real voltage modulation command and the reactive voltage modulation command. At 520, the modulation index feedback signal is compared to the modulation index setpoint. At 522, a DC bus setpoint command signal is generated based on the comparison of the modulation index feedback signal and the modulation index setpoint. The DC bus setpoint is controlled based at least in part on the DC bus setpoint command signal.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus for supplying AC power to an AC power grid from a DC power source, comprising:
   a converter coupled to the DC power source, said converter providing DC power to a DC bus;
   an inverter coupled to said DC bus, said inverter converting the DC power of said DC bus into AC power; and,
   a control system configured to regulate the DC bus voltage to be substantially equal to a variable DC bus voltage setpoint, said control system being configured to adjust the variable DC bus voltage setpoint based at least in part on an output AC current of said inverter.

2. The apparatus of claim 1, wherein the control system is configured to adjust the variable DC bus voltage setpoint based at least in part on a DC bus voltage of said DC bus and the output AC current of said inverter.

3. The apparatus of claim 1, wherein said control system is configured to regulate the DC bus voltage to operate at the variable DC bus voltage setpoint by controlling the output of said inverter.

4. The apparatus of claim 1, wherein said inverter converts the DC power of said DC bus into AC power based at least in part on a modulation index, said control system comprising a DC bus voltage setpoint regulator configured to adjust the variable DC bus voltage setpoint based at least in part on the modulation index for said inverter.

5. The apparatus of claim 4, wherein said control system regulates the variable DC bus voltage setpoint such that the modulation index of said inverter remains substantially constant.

6. The apparatus of claim 4, wherein said control system further comprises:
   a real current regulator operatively coupled to said inverter, said real current regulator providing a first modulation command to said inverter; and,
   a reactive current regulator operably coupled to said inverter, said reactive current regulator providing a second modulation command to said inverter;
   wherein said DC bus voltage setpoint regulator is configured to determine the modulation index of said inverter from the first and second modulation commands.

7. The apparatus of claim 6, wherein said control system further comprises a voltage regulator operably coupled to said real current regulator, said voltage regulator configured to provide a real current reference signal to said real current regulator based at least in part on the variable DC bus voltage setpoint.

8. A system for supplying AC power to an AC power grid from a DC power source, comprising:
   a boost converter coupled to the DC power source;
   a DC bus coupled to said boost converter, said boost converter providing DC power to said DC bus;
   an inverter coupled to said DC bus, said inverter configured to convert the DC power of said DC bus into AC power based at least in part on a modulation index;
   a monitoring system comprising a DC bus voltage sensor and an output AC current sensor, said DC bus voltage sensor providing a DC bus voltage feedback signal based on the DC bus voltage, said output AC current sensor providing an output AC current feedback signal based on the output AC current of said inverter; and,
   a control system configured to control the DC bus voltage to be substantially equal to a variable DC bus voltage setpoint, said control system configured to adjust the variable DC voltage setpoint based at least in part on the DC bus voltage feedback signal and the output AC current feedback signal so that the modulation index of said inverter remains substantially constant.

9. The system of claim 8, wherein said control system comprises:
   a voltage regulator configured to compare the DC bus voltage feedback signal to the variable DC bus voltage setpoint, said voltage regulator providing a real current reference command based on the comparison of the DC bus voltage and the DC bus voltage setpoint;
   a real current regulator configured to compare the real current reference command to the output AC current feedback signal of said inverter, said real current regulator providing a real voltage command based on the comparison of the real current reference command to the output AC current of said inverter, said real current regulator configured to normalize the real voltage command based on the DC bus voltage feedback signal to provide a first modulation command for said inverter; and, a reactive current regulator configured to compare a reactive current setpoint to the output AC current feedback signal, said reactive current regulator providing a reactive voltage command based on the comparison of the reactive current setpoint to the output AC current feedback signal, said reactive current regulator configured to normalize the reactive voltage command based on the DC bus voltage feedback signal to provide a second modulation command for said inverter.

10. The system of claim 9, wherein said DC bus voltage setpoint regulator is configured to determine a modulation index feedback signal from at least one of the first modulation command and the second modulation command.

11. The system of claim 10, wherein said DC bus voltage setpoint regulator compares the modulation index feedback signal with a modulation index setpoint to generate a variable DC bus voltage setpoint signal.

12. The system of claim 11, wherein said control system regulates the variable DC bus voltage setpoint based on the variable DC bus voltage setpoint signal.

13. The system of claim 9, wherein the modulation index can be determined as a function of the first modulation command.

14. The system of claim 9, wherein the modulation index can be determined as a function of the second modulation command.

15. A method for controlling a DC bus voltage in a system for providing AC power to an AC power grid from a DC power source, said method comprising:
  providing DC power to a DC bus at a DC bus voltage;
  converting the DC power on the DC bus to AC power with an inverter coupled to the DC bus, the inverter having an output AC current;
  controlling the DC bus voltage to be substantially equal to a DC bus voltage setpoint; and,
  varying the DC bus voltage setpoint based in part on an output AC current of the inverter.

16. The method of claim 15, where the method comprises varying the DC bus voltage setpoint based in part on a DC bus voltage of the DC bus and the output AC current of the inverter.

17. The method of claim 15, wherein said method comprises varying the DC bus voltage setpoint based at least in part on a modulation index for the inverter.

18. The method of claim 17, wherein said method comprises:
  comparing the DC bus voltage to the DC bus voltage setpoint;
  generating a real current reference command signal based on said comparison of the DC bus voltage to the DC bus voltage setpoint;
  comparing the real current reference command signal to the output AC current;
  generating a real voltage command signal based on said comparison of the real current reference command signal to the output AC current;
  normalizing the real voltage command signal based on the output DC bus voltage to generate a real voltage modulation command; and,
  providing the real voltage modulation command to the inverter to control the inverter.

19. The method of claim 18, wherein said method comprises:
  comparing a reactive current setpoint to the output AC current;
  generating a reactive voltage command signal based on said comparison of the reactive current setpoint to the output AC current;
  normalizing the reactive voltage command signal based on the output DC bus voltage to generate a reactive voltage modulation command; and,
  providing the reactive voltage modulation command to the inverter to control the inverter.

20. The method of claim 19, wherein said method comprises:
  determining a modulation index feedback signal from at least one of the real voltage modulation command and the reactive voltage modulation command;
  comparing the modulation index feedback signal to a modulation index setpoint;
  generating a DC bus voltage setpoint command signal based on said comparison of the modulation index to the modulation index setpoint; and,
  varying the modulation index setpoint value based on the DC bus voltage setpoint command signal.

* * * * *